(12) United States Patent
Martin et al.

(10) Patent No.: US 6,198,916 B1
(45) Date of Patent: Mar. 6, 2001

(54) CALL SCREENING IN WIRELESS SYSTEMS

(75) Inventors: Ronald Bruce Martin, Carol Stream; Randall Joe Wilson, Naperville, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/305,382

(22) Filed: May 5, 1999

(51) Int. Cl.$^7$ .................................................. H04M 3/42
(52) U.S. Cl. ...................... 455/413; 455/566; 379/88.13; 379/211
(58) Field of Search ..................................... 455/412, 413, 455/415, 466, 566, 567, 422, 575; 379/88.11, 88.12, 88.13, 88.14, 88.15, 210, 211, 212, 127, 142, 52, 93.17, 93.18

(56) References Cited

U.S. PATENT DOCUMENTS

| | | | |
|---|---|---|---|
| 5,327,486 | * 7/1994 | Wolff et al. | 379/211 |
| 5,694,455 | * 12/1997 | Goodman | 455/413 |
| 5,930,700 | * 7/1999 | Pepper et al. | 455/414 |
| 5,995,590 | * 11/1999 | Brunet et al. | 379/52 |
| 6,018,671 | * 1/2000 | Bremer | 455/567 |
| 6,094,574 | * 7/2000 | Vance et al. | 455/415 |

* cited by examiner

Primary Examiner—Nay Maung
Assistant Examiner—Quochien B. Vuong
(74) Attorney, Agent, or Firm—Werner Ulrich

(57) ABSTRACT

An apparatus and a method for allowing a user of a wireless station to screen incoming calls by presenting to the user a displayed text generated by a speech-to-text converter, the text corresponding to the initial portion of a message that the caller is leaving on the called party's voice mail system. Advantageously, the called party can screen calls, not only by caller identification, which may or may not be present, but also by the specifics of the message that the caller is planning to leave for the called party. Advantageously, using this arrangement, the caller need not know that the called customer could have answered the call, a disadvantage with arrangements such as call waiting, in which there is a brief exchange before a connection is either established, or not established, to the interrupting party.

5 Claims, 3 Drawing Sheets

CALL SCREENING IN WIRELESS SYSTEMS

TECHNICAL FIELD

Figure 1:
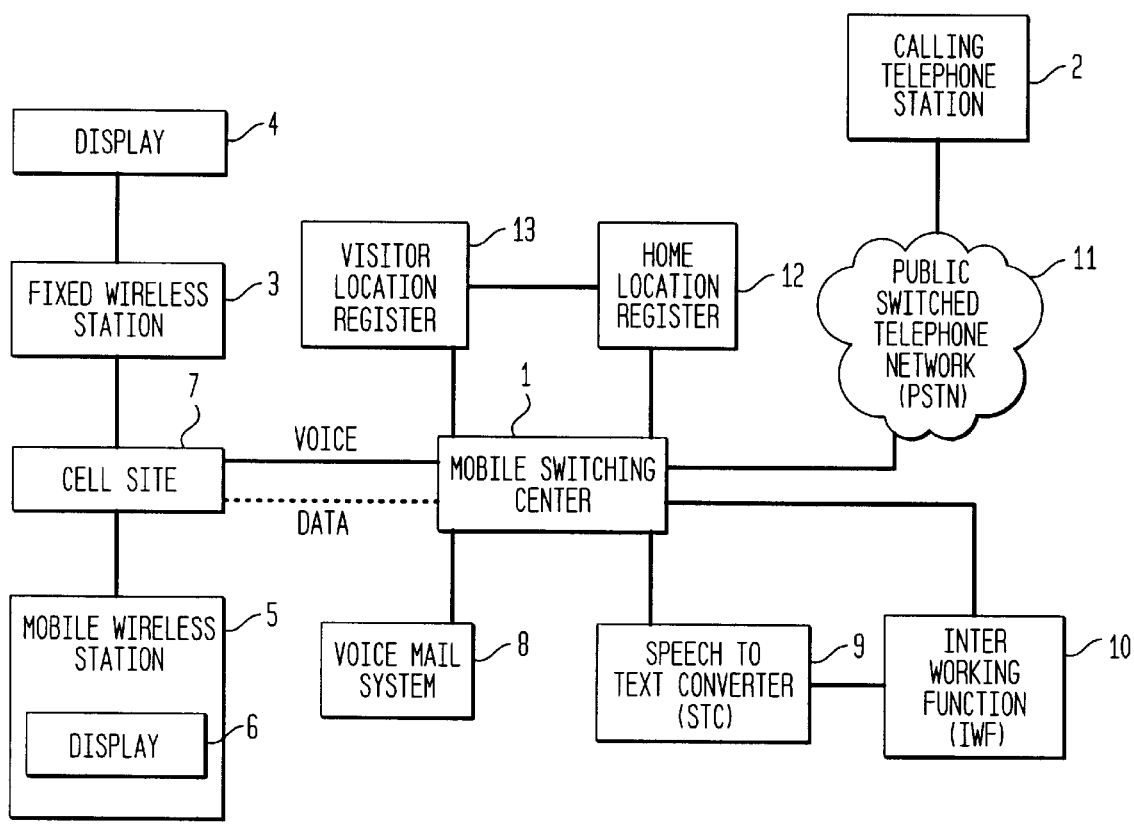

This invention relates to arrangements for permitting wireless customers to screen incoming calls. (Screening means deciding whether or not to accept a call.)

PROBLEM

Incoming calling line identification can be provided to wireless (both mobile, and fixed) customers, as well as to fixed line customers. While the identity of the caller, (if, in fact, it is passed on through the identification process), may be adequate information for making the decision as to whether or not to accept the call, in some cases, especially if the called party is very busy, only important calls from a particular caller should be accepted. In most cases, especially in the case of mobile wireless customers, no answering machine is available to allow the called party to listen for a few seconds, and then pick up the call. A problem of the prior art is that for calls terminating on wireless telephones, insufficient information is available to allow the called party to decide whether or not to accept the call.

SOLUTION

The above problem is solved, and an advance is made over the teachings of the prior art in accordance with this invention, wherein the opening portion of an incoming call is transmitted to a speech-to-text converter (STC), whose output text is then sent to the terminating wireless station for display on a display unit for that station, the called party can then decide whether or not to accept the call; the called party signals to the mobile switch serving the incoming call, and the mobile switching center then connects the call to the terminating wireless customer. Advantageously, such an arrangement allows the called customer to decide whether or not to accept the call, based not only on whether the calling line identification information is received, but also on the opening portion of the message that is being recorded for the calling telephone customer.

In accordance with one feature of the invention, if the called customer does not choose to answer the call, the call will continue to be connected to a voice mail system accessible from the mobile switching center (MSC) serving the terminating portion of the call.

BRIEF DESCRIPTION OF THE DRAWING(S)

Figure 2:
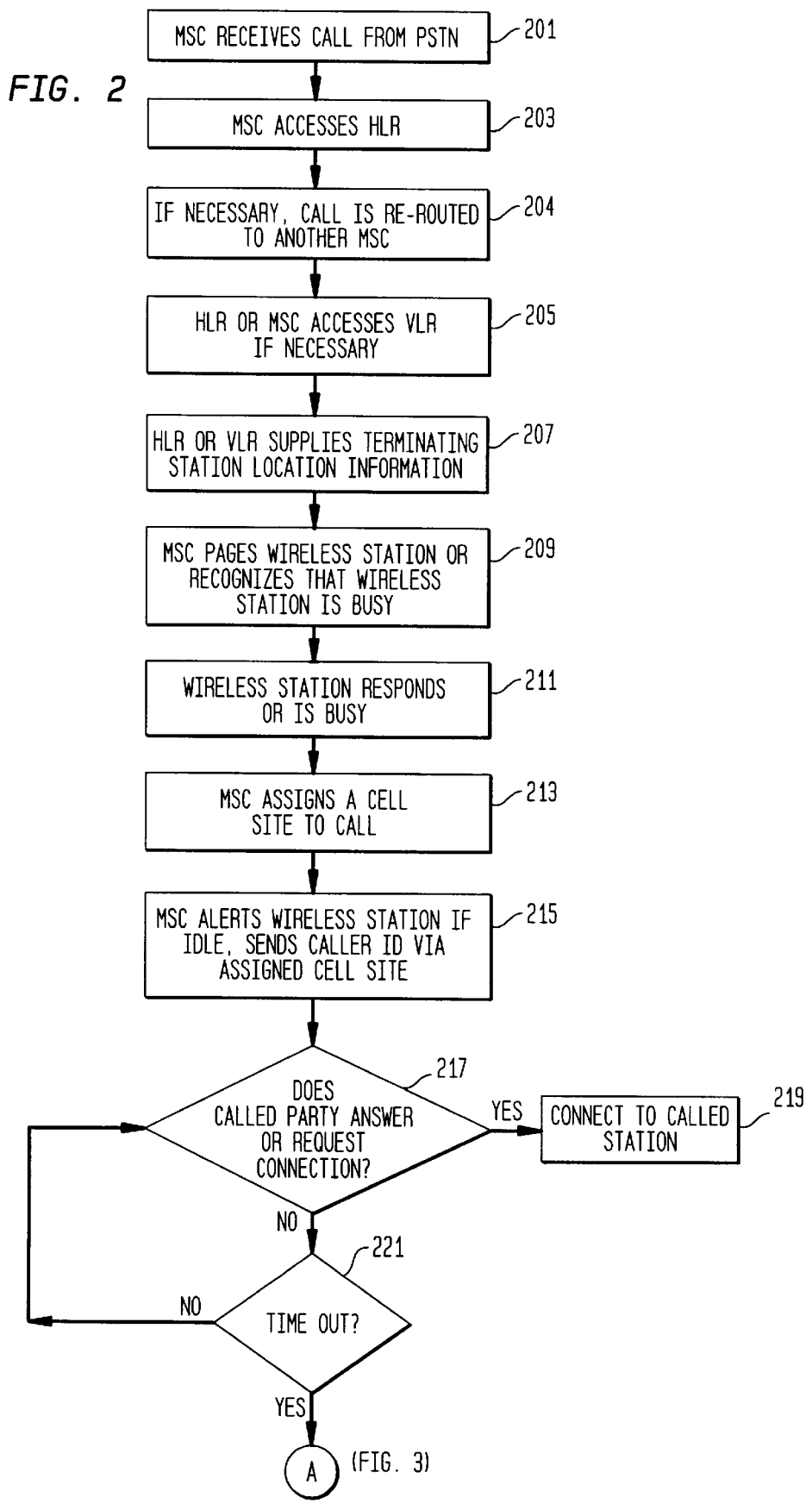
Figure 3:
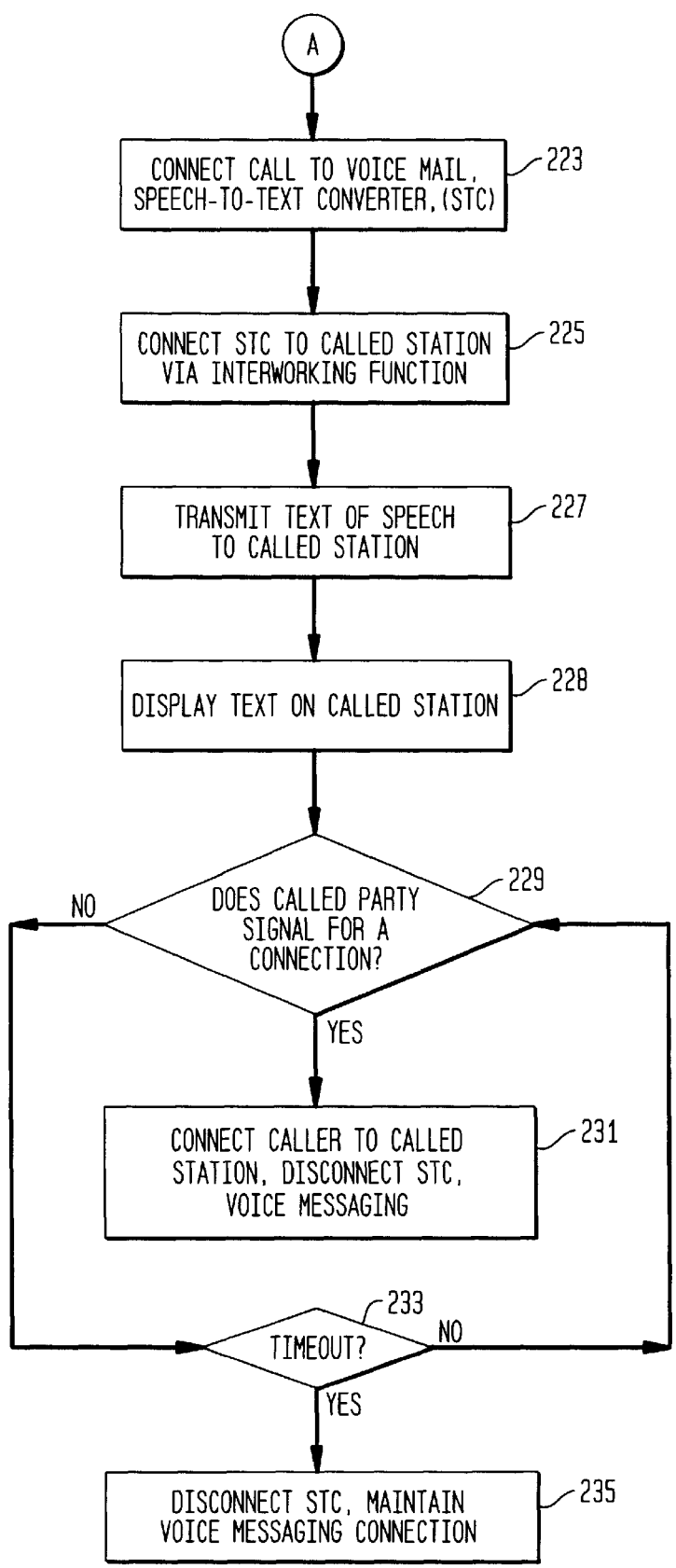

FIG. 1 is a block diagram, illustrating the operation of Applicant's invention; and FIGS. 2 and 3 are flow diagrams, illustrating the operation of Applicant's invention.

DETAILED DESCRIPTION

FIG. 1 is a block diagram, illustrating Applicants' invention. An originating station 2, dials or keys a telephone number of a fixed wireless station 3, having a display unit 4, or a mobile telephone station 5, having a display 6. Cell site, (base station) 7 serves stations 3 and 5. Cell site 7 is, in turn, controlled by Mobile Switching Center (MSC) 1, which is connected to Public Switched Telephone Network (PSTN) 11. Station 2 accesses MSC 1 via the PSTN 11. When the call is received in MSC 1, the switching center obtains information concerning the location of mobile station 5, from a combination of home location register (HLR) 12, and visitor location register (VLR) 13 as appropriate, given the location of the mobile with respect to the home system. If the call is for a fixed wireless station 3, the MSC will have a record of the serving cell site for that station. The VLR and/or HLR respond to MSC 1 with an identity of an area in which mobile station 5 is likely to be found, and MSC 1 controls a paging process. Several cell sites may participate in the paging process, but the result of the paging process is that the mobile station is located, and a cell site, such as cell site 7, is assigned to serve the call. MSC 1 then sends a signal to cell site 7 to alert the called station, and to transmit calling party identification information, (typically, a telephone number and/or a name), to that station.

If the called party does not answer within a pre-specified number of rings, or has subscribed to a service for forwarding the call on "busy" to voice mail, and the called party is busy, or if the called customer is on another call, subscribes to call waiting, and does not answer the waiting call within a pre-specified time, then, the call is routed to voice mail. If the called party subscribes to the service described in this Application, the call is also routed to a voice-to-text processor 9, connected to MSC 1. The text corresponding to the opening portion of the message that the calling party is leaving for the called party, is sent to an Interworking Function (IWF), (a well-known standardized second and third generation wireless unit), which generates a data message corresponding to the text for transmission via the MSC to the called telephone station; the data message is sent via a separate communication which exists in parallel with the voice communication path. This separate communication path is currently implemented in some technologies as simultaneous voice and data, and is under standards review in other technologies. If the called customer decides to accept the call, the called customer simply answers the call; in response to receipt of the answer signal, the MSC establishes a connection from the PSTN input of the call to the wireless station, disconnects the connection to voice mail, and deletes the partial message to the voice-to-text converter. If the called station does not answer, the voice-to-text processor is disconnected after a pre-determined time, and the full message from the caller continues to be recorded in the voice mail system.

FIGS. 2 and 3 are flow diagrams, showing the operation of Applicant's invention. The subject matter of FIG. 2 is from the prior art. A call is received from the PSTN at the MSC, (Action Block 201). In accordance with normal wireless call processing procedures, the MSC accesses the home location register function (HLR), and/or visitor location register function (VLR), to obtain up-to-date location information for the called customer, (Action Blocks 203 and 205). If necessary, the call is routed to another MSC. If the HLR accesses a visitor location register function (VLR), in order to obtain up-to-date information about the location of the called station, (Action Block 205), the HLR/VLR supplies the information for locating the called station, (Action Block 207). If the called station is a fixed wireless station, Action Blocks 203–207 can be bypassed since the MSC already knows the location of the called station. The MSC then controls paging of the wireless station, (Action Block 209). If the wireless station responds to the page, (Action Block 211), then the MSC assigns a cell site to the call, (Action Block 213). The assignment step in the case of a fixed wireless station is not dependent on the response to the page.

The MSC then alerts the called wireless station, and sends caller identification, if available, via the selected cell site to the called station, (Action Block 215). Test 217 checks for an answer signal from the called station. If an answer signal is received, then the call is connected to the called station, (Action Block 219), as in the prior art. If the called station does not answer, then Test 221 is used to determine if sufficient time has elapsed from the time that alerting began. If not, Test 217 is re-entered. If sufficient time has elapsed, then the call is connected to voice mail, and if the called party subscribes to the service described herein, to a speech-to-text converter (STC), (Action Block 223, FIG. 3). The STC is connected to the called station via an Interworking Function (IWF) for unit, (Action Block 225), for passing the data of the text to the called station. The text is then displayed on the display of the called station, (Action Block 228).

Test 229 checks for a signal requesting a call connection by the called party. The signal can be a programmed button on the wireless station, or a pre-determined series of signals from a keypad of the station. If the called party signals for a call connection, then the caller is connected to the called station, and the connection to the STC and the voice messaging system is dropped, (Action Block 231). If no call connection request signal has been received, then Test 233 is entered to check if sufficient time has elapsed since the call was connected to the voice mail and STC units. If not, then Test 229 is re-entered. If a time out has occurred, then the STC is disconnected, but the connection to the voice messaging system is maintained.

The speech-to-text converter should be capable of performing reasonably as a speaker independent customer speech recognition system. However, it need not be perfect, since it only needs present to the user adequate information for making the decision of whether to accept the call. Further, the recorded message on the answering machine can prompt the caller to speak slowly, or perhaps to spell a name or other indication. Speech recognition is rapidly improving so that the recovery of the speech-to-text conversion can be expected to improve also.

The above has presented one preferred embodiment of Applicants' invention. Many alternatives to this embodiment will be obvious to those of ordinary skill in the art. The invention is only limited by the attached Claims.

What is claimed is:

1. In a wireless communication system, a method of completing a call to a called station, comprising the steps of:
   receiving an incoming call at a mobile telephone switching center;
   alerting said called station;
   if said called station answers within a first pre-determined interval, connecting said incoming call to said called station;
   if said called station does not answer within said first pre-determined interval, connecting said call to a voice mail system, and to a speech-to-text converter (STC);
   displaying the output of said STC on a display of said called station;
   if said called station does not answer within a second pre-determined interval, disconnecting said STC, and maintaining said voice mail connection;
   if said called station answers within said second pre-determined interval, connecting said incoming call to said called station.

2. The method of claim 1, further comprising the step of:
   if said called station is busy on another call, displaying the output of said STC on said display.

3. The method of claim 2, further comprising the step of:
   displaying a caller identification on said display of said called station.

4. The method of claim 1, further comprising the step of:
   displaying a caller identification on said display of said called station.

5. The method of claim 1, wherein said called station has call waiting service, and wherein the output of said STC is displayed on a display of said called station, wherein the output of said STC represents a waiting call.

\* \* \* \* \*